US011018984B2

(12) United States Patent
Decarreau et al.

(10) Patent No.: US 11,018,984 B2
(45) Date of Patent: May 25, 2021

(54) PACKET DATA CONVERGENCE PROTOCOL WINDOWS WITH SPLIT BEARERS

(71) Applicant: Nokia Technologies Oy, Espoo (FI)

(72) Inventors: Guillaume Decarreau, Munich (DE); Benoist Pierre Sebire, Tokyo (JP); Henri Markus Koskinen, Espoo (FI); Samuli Heikki Turtinen, Ii (FI); Chunli Wu, Beijing (CN); Esa Mikael Malkamaki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 7 days.

(21) Appl. No.: 16/497,303

(22) PCT Filed: Mar. 24, 2017

(86) PCT No.: PCT/CN2017/078190
§ 371 (c)(1),
(2) Date: Sep. 24, 2019

(87) PCT Pub. No.: WO2018/170923
PCT Pub. Date: Sep. 27, 2018

(65) Prior Publication Data
US 2020/0382431 A1 Dec. 3, 2020

(51) Int. Cl.
*H04L 12/807* (2013.01)
(52) U.S. Cl.
CPC .................... *H04L 47/27* (2013.01)
(58) Field of Classification Search
CPC . H04L 47/27; H04L 47/34; H04L 1/08; H04L 1/187; H04L 1/188; H04W 12/033;
(Continued)

(56) References Cited

U.S. PATENT DOCUMENTS

2008/0137652 A1* 6/2008 Herrmann ........... H04L 63/0428
370/389
2008/0198763 A1* 8/2008 Fischer ................ H04W 76/25
370/254
(Continued)

FOREIGN PATENT DOCUMENTS

| CN | 104519477 A | 4/2015 |
|---|---|---|
| CN | 104935413 A | 9/2015 |

(Continued)

OTHER PUBLICATIONS

Extended European Search Report received for corresponding European Patent Application No. 17901909.6, dated Oct. 29, 2020, 12 pages.

(Continued)

*Primary Examiner* — Stephen J Clawson
(74) *Attorney, Agent, or Firm* — Nokia Technologies Oy

(57) ABSTRACT

Various communication systems may benefit from the appropriate control of the timing of communication. For example, certain wireless communication systems may benefit from packet data convergence protocol windows, for example in the case of split bearers being in use. A method can include transmitting a plurality of protocol data units over a bearer mapped to a plurality of logical channels. The protocol data units can be transmitted in a radio link control unacknowledged mode. The method can also include managing at least one transmission characteristic of the transmitted plurality of protocol data units.

12 Claims, 5 Drawing Sheets

(58) Field of Classification Search
CPC ............... H04W 12/04; H04W 12/106; H04W 36/0069; H04W 36/08; H04W 36/18; H04W 76/27; H04W 76/19; H04W 76/20; H04W 24/02; H04W 80/02
See application file for complete search history.

(56) References Cited

U.S. PATENT DOCUMENTS

| | | | | |
|---|---|---|---|---|
| 2014/0198643 | A1* | 7/2014 | Conway | H04W 28/0278 370/230 |
| 2018/0083688 | A1* | 3/2018 | Agiwal | H04M 3/42229 |
| 2018/0206173 | A1* | 7/2018 | Virtej | H04L 45/121 |
| 2018/0279168 | A1* | 9/2018 | Jheng | H04W 28/04 |
| 2018/0279262 | A1* | 9/2018 | Babaei | H04W 72/04 |

FOREIGN PATENT DOCUMENTS

| | | |
|---|---|---|
| CN | 106332046 A | 1/2017 |
| CN | 106470416 A | 3/2017 |
| EP | 2830352 A1 | 1/2015 |

OTHER PUBLICATIONS

"3rd Generation Partnership Project; Technical Specification Group Radio Access Network; Study on New Radio Access Technology; Radio Interface Protocol Aspects (Release 14)", 3GPP TR 38.804, V1.0.0, Mar. 2017, pp. 1-56.

"Upper Layer Aggregation (DC like) for Multi-Connectivity", 3GPP TSG-RAN WG2 NR Ad Hoc, Tdoc R2-1700437, Agenda : 3.2.1.1, Ericsson, Jan. 17-19, 2017, 2 pages.

"Evaluation on Packet Duplication in Multi-Connectivity", 3GPP TSG-RAN2 NR Ad Hoc, R2-1700172, Agenda : 3.2.1.1, Huawei, Jan. 17-19, 2017, 7 pages.

"Duplication Impacts to PDCP", 3GPP TSG-RAN WG2 Meeting #97bis, R2-1702642, Agenda : 10.3.3.2, Nokia, Apr. 3-7, 2017, 5 pages.

"New SID Proposal: Study on New Radio Access Technology", 3GPP TSG RAN Meeting #71, RP-160671, Agenda 9.1, NTT DOCOMO, Mar. 7-10, 2016, 10 pages.

"3rd Generation Partnership Project; Technical Specification Group Radio Access Network; Study on New Radio Access Technology; Radio Interface Protocol Aspects (Release 14)", 3GPP TR 38.804, V0.4.0, Nov. 2016, pp. 1-30.

"New Work Item Description: Dual Connectivity for LTE", 3GPP TSG-RAN Meeting #62, RP-132069, Agenda : 13.1.2, NTT DOCOMO, Dec. 3-6, 2013, 6 pages.

"3rd Generation Partnership Project; Technical Specification Group Radio Access Network; Study on Small Cell enhancements for E-UTRA and E-UTRAN; Higher layer aspects (Release 12)", 3GPP TR 36.842, V12.0.0, Dec. 2013, pp. 1-82.

"PDCP Window Handling for Split Bearers", 3GPP TSG-RAN WG2 Meeting #86, R2-142087, Agenda : 7.1.4, NSN, May 19-23, 2014, 9 pages.

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323, V14.1.0, Dec. 2016, pp. 1-39.

"3rd Generation Partnership Project; Technical Specification Group Radio Access Network; Evolved Universal Terrestrial Radio Access (E-UTRA); Radio Link Control (RLC) protocol specification (Release 14)", 3GPP TS 36.322, V14.0.0, Mar. 2017, pp. 1-45.

"3rd Generation Partnership Project; Technical Specification Group Radio Access Network; Evolved Universal Terrestrial Radio Access Network (E-UTRAN); X2 interface user plane protocol (Release 14)", 3GPP TS 36.425, V14.0.0, Mar. 2017, pp. 1-17.

International Search Report and Written Opinion received for corresponding Patent Cooperation Treaty Application No. PCT/CN2017/078190, dated Aug. 28, 2017, 11 pages.

* cited by examiner

PACKET DATA CONVERGENCE PROTOCOL WINDOWS WITH SPLIT BEARERS

RELATED APPLICATION

This application was originally filed as PCT Application No. PCT/CN2017/078190, filed on 24 Mar. 2017.

BACKGROUND

Field

Various communication systems may benefit from the appropriate control of the timing of communication. For example, certain wireless communication systems may benefit from packet data convergence protocol windows, for example in the case of split bearers being in use.

Description of the Related Art

Dual connectivity is a mode of operation of a user equipment (UE) in radio resource control (RRC) connected mode, configured with a master cell group (MCG) and a secondary cell group (SCG). FIG. 1 illustrates control plane (C-plane) connectivity for dual connectivity. FIG. 2 shows user plane U-plane) connectivity for dual connectivity.

FIG. 1 and FIG. 2 show examples of C-plane and U-plane architecture for dual connectivity, respectively. Thus, FIG. 1 illustrates C-Plane connectivity of evolved Node Bs (eNBs) involved in dual connectivity, whereas FIG. 2 illustrates U-Plane connectivity of eNBs involved in dual connectivity.

In dual connectivity involving evolved universal terrestrial radio access network (E-UTRAN) and evolved packet core (EPC), there are at least three types of bearer. For MCG bearers, the MeNB is U-plane connected to the S-GW via S1-U, and the SeNB is not involved in the transport of user plane data. For split bearers, the MeNB is U-plane connected to the S-GW via S1-U and in addition, and the MeNB and the SeNB are interconnected via X2-U. For SCG bearers, the SeNB is directly connected with the S-GW via S1-U.

In order to support high bit rates, concatenation may be moved to medium access control (MAC) and reordering may be moved to packet data convergence protocol (PDCP), leaving to radio link control (RLC) the main functions of error correction and segmentation/re-assembly.

Furthermore, to increase reliability as well as potentially decrease latency, packet duplication at PDCP can occur as described in 3GPP TR 38.804. Packet duplication can be used for both dual connectivity and carrier aggregation. In the following, duplication will be referred as sending the same PDCP protocol data unit (PDU) via two or more different RLC entities belonging to two or more different legs, for example when dual or more connectivity is configured. The different legs may also belong to two or more logical channels configured for duplication without dual or multi connectivity.

Unacknowledged mode (UM) may be supported in new radio (NR) dual connectivity. This may allow the possibility of PDCP duplication in UM mode for ultra reliable low latency communications (URLLC). The NR RLC may support three transmission modes: acknowledged mode (AM), UM and transparent mode (TM). Additionally, split bearers may support RLC UM mode in addition to RLC AM mode.

For reference and not by way of limitation, in the LTE PDCP specification, TS 36.323, COUNT, HFN, and PDCP SN are defined as described below. Only the PDCP sequence number (SN) is carried in the header of PDCP Data PDUs. The hyper-frame number (HFN) is inferred at PDU reception. Correct HFN inference is used to extract the correct service data unit (SDU) as the result of de-ciphering a PDCP data PDU once received.

COUNT is described in TS 36.323 as a 32 bit long value. According to TS 36.323, the COUNT value can be composed of an HFN and the PDCP SN. The length of the PDCP SN can be configured by upper layers. The HFN part can be 32 bits minus the length of the PDCP SN. When performing comparison of values related to COUNT, the UE can take into account that COUNT is a 32-bit value, which may wrap around, such that for example COUNT value of $2^{32}-1$ may be less than COUNT value of 0.

Also for reference and not by way of limitation, an example of the operation of a pulled reception window is that specified in LTE RLC TS 36.322 for Unacknowleged-mode (UM) data transfer. In the PDCP protocol, so far there is no reception window maintained for radio bearers mapped on RLC UM.

According to TS 36.322, section 5.1.2, a receiving UM RLC entity is supposed to maintain a reordering window according to state variable VR(UH) as follows: a SN falls within the reordering window if (VR(UH)–UM_Window-_Size)<=SN<VR(UH) and otherwise a SN falls outside of the reordering window. Moreover, when a UMD PDU with SN=x is placed in the reception buffer, the receiving UM RLC entity is supposed to, if x falls outside of the reordering window, update VR(UH) to x+1.

Moreover, according to TS 36.322, section 7.1, VR(UH) can be a UM highest received state variable. This state variable can hold the value of the SN following the SN of the UMD PDU with the highest SN among received UMD PDUs, and can serve as the higher edge of the reordering window.

Similarly, according to TS 36.322, section 7.2, UM_Window_Size is a constant that can be used by the receiving UM RLC entity to define SNs of those UMD PDUs that can be received without causing an advancement of the receiving window. For example, UM_Window_Size=16 when a 5 bit SN is configured, UM_Window_Size=512 when a 10 bit SN is configured, and UM_Window_Size=0 when the receiving UM RLC entity is configured for multicast control channel (MCCH), Multicast traffic channel MTCH, single cell (SC) MCCH (SC-MCCH), SC-MTCH, or sidelink traffic channel (STCH).

SUMMARY

According to certain embodiments, a method can include transmitting a plurality of protocol data units over a bearer mapped to a plurality of logical channels. The protocol data units can be transmitted in a radio link control unacknowledged mode. The method can also include managing at least one transmission characteristic of the transmitted plurality of protocol data units.

In certain embodiments, a method can include receiving a plurality of protocol data units over a bearer mapped to a plurality of logical channels. The protocol data units can be transmitted in a radio link control unacknowledged mode. The method can further include sending information regarding the location of the protocol data units to a sender of the protocol data units.

An apparatus, according to certain embodiments, can include at least one processor and at least one memory including computer program code. The at least one memory and the computer program code can be configured to, with the at least one processor, cause the apparatus at least to transmit a plurality of protocol data units over a bearer mapped to a plurality of logical channels. The protocol data units can be transmitted in a radio link control unacknowledged mode. The at least one memory and the computer program code can also be configured to, with the at least one processor, cause the apparatus at least to manage at least one transmission characteristic of the transmitted plurality of protocol data units.

An apparatus, in certain embodiments, can include at least one processor and at least one memory including computer program code. The at least one memory and the computer program code can be configured to, with the at least one processor, cause the apparatus at least to receive a plurality of protocol data units over a bearer mapped to a plurality of logical channels. The protocol data units can be transmitted in a radio link control unacknowledged mode. The at least one memory and the computer program code can further be configured to, with the at least one processor, cause the apparatus at least to send information regarding the location of the protocol data units to a sender of the protocol data units.

According to certain embodiments, an apparatus can include means for transmitting a plurality of protocol data units over a bearer mapped to a plurality of logical channels. The protocol data units can be transmitted in a radio link control unacknowledged mode. The apparatus can also include means for managing at least one transmission characteristic of the transmitted plurality of protocol data units.

In certain embodiments, an apparatus can include means for receiving a plurality of protocol data units over a bearer mapped to a plurality of logical channels. The protocol data units can be transmitted in a radio link control unacknowledged mode. The apparatus can further include means for sending information regarding the location of the protocol data units to a sender of the protocol data units.

A computer program product can encode instructions for performing a process. The process can include any of the above-described methods.

A non-transitory computer-readable medium can be encoded with instructions that, when executed in hardware, perform a process. The process can include any of the above-described methods.

BRIEF DESCRIPTION OF THE DRAWINGS

For proper understanding of the invention, reference should be made to the accompanying drawings, wherein.

DETAILED DESCRIPTION

Figure 1:
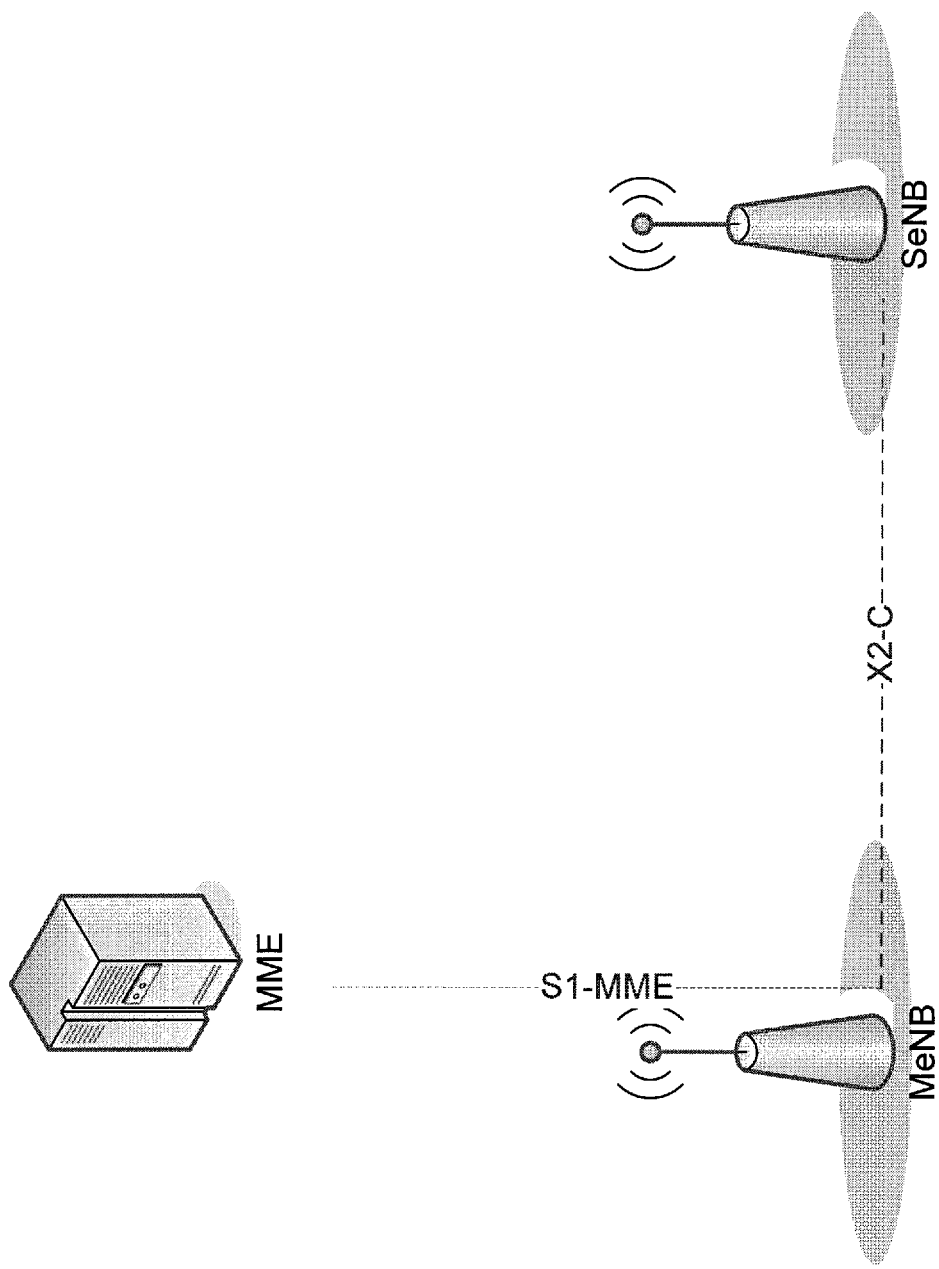
FIG. 1 illustrates control plane (C-plane) connectivity for dual connectivity.
Figure 2:
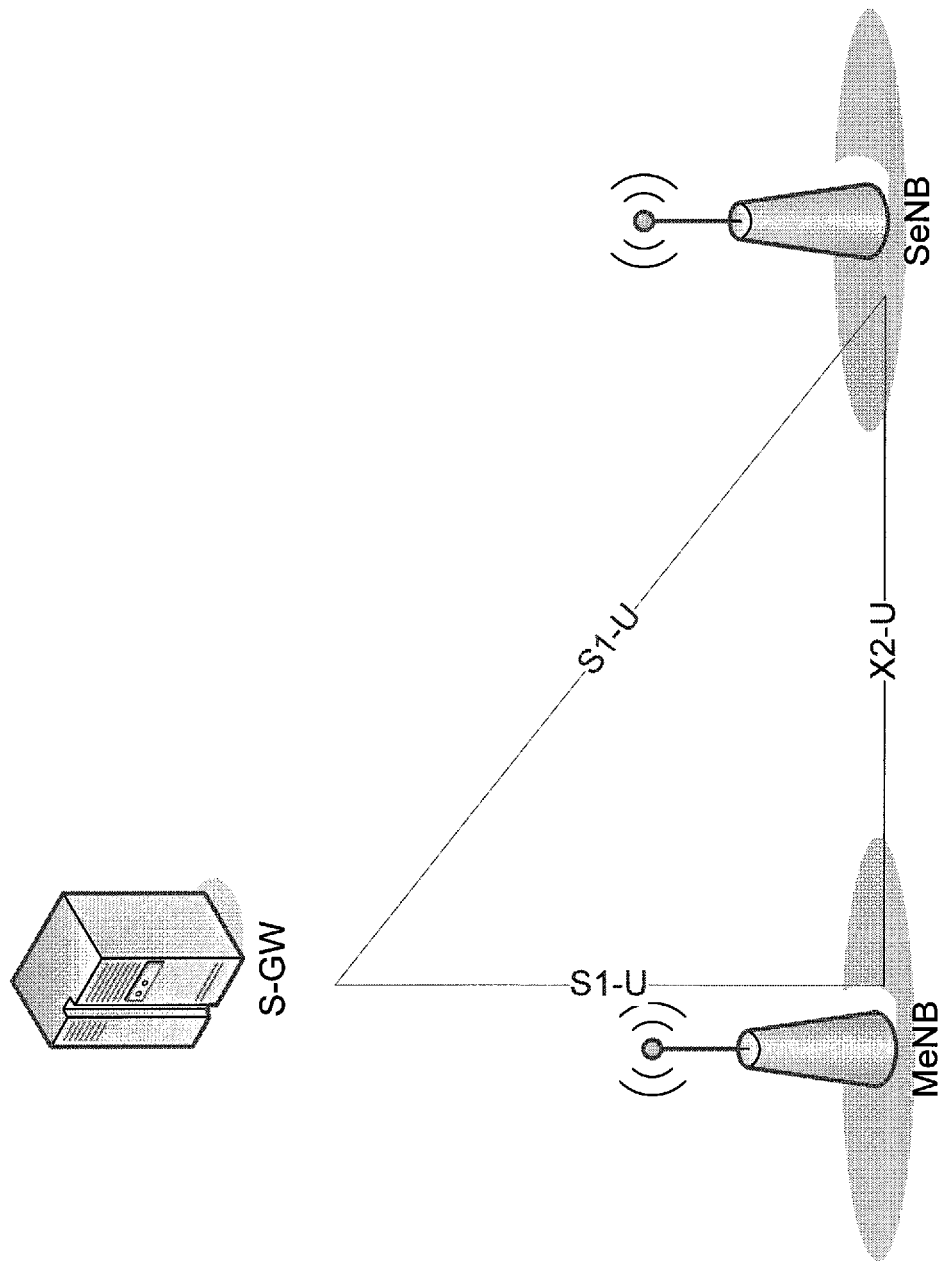
FIG. 2 shows user plane (U-plane) connectivity for dual connectivity.

When PDCP is using UM, a pulled window mechanism may be needed to maintain hyper frame number (HFN). The mechanism can be similar to the LTE RLC UM windows handling: the packets received outside the receiving window can be considered as new and the head of the receiving window can be moved to the newly received packet.

As there is no acknowledgement of the RLC PDU in UM, the transmitter has no way to know the status of the receiving window at the reception entity. As a result, any received PDU whose count value is not the highest among PDUs received so far is supposed to be received within the reception window. Otherwise, such a PDU may be considered as an early PDU with a count value highest so far and may be treated with another HFN leading to potential HFN desynchronization.

In case of single connectivity, in LTE, there may be no reason to have out of order reception of the packets because RLC UM delivers the packet in order. In NR, even if RLC UM does not deliver packets in order, the only source of out of order may be MAC hybrid automatic repeat request (HARQ), which may not have major delay between out of order packets.

However, in case of dual connectivity, the two legs can have different delay, and the time of transmission in one leg can be different from the other one. In case of congestion in one leg, the time difference can even be higher. Therefore, it could happen that an old packet that is received too late via one leg could be erroneously considered as a new packet.

HFN synchronization is traditionally ensured by maintaining a transmission window at PDCP so that the PDCP PDUs over the air only contain a sequence number (SN) within the transmission window. When one transmission path is delayed, the window can be slowed down to avoid HFN desynchronization.

With PDCP duplication for RLC UM, PDCP can duplicate data over two or more transmission paths, which can be visible as separate logical channels (LCHs) at the MAC layer. The duplication can be done regardless of the scheduling status of the individual paths. With multiple transmission paths, one path being scheduled can be enough for the transmissions window to progress. Because it cannot always be ensured that all paths are scheduled simultaneously, for example due to congestion on one path and/or different radio link condition, a slow path may find itself so far behind that the data it is supposed to transmit could lead to HFN desynchronization. For UM, if the PDU is received outside the reception window, the PDU can be considered as a new PDU with an HFN increased by one, leading to HFN desynchronization, as mentioned above.

For very low latency services, such as URLLC, when using packet duplication if one of the transmission paths is delayed, the packets via that path may be received too late from URLLC point of view and that transmission path may be useless for URLLC purposes. A packet received too late does not improve reliability, if it is discarded in the receiver even though the packet via the other path has been received incorrectly.

A PDCP entity may need to ensure that the PDCP PDUs being sent over the air only contain SNs within the transmission window, to avoid HFN desynchronization (de-sync), thereby ensuring correct HFN inference at reception of a PDCP Data PDU.

For very low latency services with packet duplication, the transmission window can be much smaller than required for avoiding HFN desynchronization. In this case the small transmission window can be maintained to keep the two or more legs of the bearer in sync. If the PDCP PDU at the transmitter does not fit into this small transmission window, it can be discarded.

With split bearers over RLC UM, the risk appears that after one of the underlying RLCs delivers a recent and hence high-numbered PDCP PDU to the receiver, thus pulling the PDCP reception window forward for unacknowledged data transfer, another RLC entity may deliver an aged PDU so low-numbered that it falls out of the updated reception window and is therefore mistaken for another high-numbered PDU, causing HFN de-sync. Such out-of-phase PDU delivery can happen because it cannot always be ensured that both RLCs are scheduled with balanced bit rates, for example due to congestion on one path as well as different radio link conditions.

In a specific example, a PDCP-SN space may be 0 . . . 15 and reception-window size may be 8. In this example, a data-receiving PDCP entity may receive a PDU with SN=13 from a first underlying RLC entity. This SN can set the new reception window to the SN range 6 . . . 13. Next, an older PDU with SN=3 can be received from a second underlying RLC entity. By the properties of the pulled reception window (as discussed above), because this SN falls outside the current reception window, the reception of this SN can set the new window to 12, . . . , 15, 0, . . . , 3. Thus, it is interpreted that after the reception of the previous PDU, the SN has progressed beyond the maximum SN value 15 and wrapped around, and accordingly that the associated HFN value is one greater than that of the previous PDU. This inference is incorrect in this example, because the PDU with SN=3 was actually aged and was associated with the same HFN value as the previous PDU with SN=13.

In certain embodiments, the data-receiving PDCP entity can give feedback to the peer PDCP entity on the location of PDUs received within the receiving window. With this information, the transmitter can determine if the receiving window is too small or too large and can make the necessary adjustments, such as decreasing the bit rate of transmission on the split bearer, or reconfiguring the split bearer with a larger or smaller receiving window.

In addition or as an alternative, for reactive actions for cases where old PDUs are mistaken for new ones, when the pulled PDCP receiving window advances suspiciously much at one go, for example by more than a pre-specified or preconfigured threshold of PDCP sequence numbers (SNs), the data-receiving PDCP entity can send to the peer entity an indication of that suspicious behavior, possibly including the highest count value that has so far been determined to be associated with a received PDU. If no such count value has been transmitted yet, the transmitter can know that HFN de-synchronization has happened and that PDCP re-establishment may be needed for count re-alignment on the bearer.

The receiving PDCP entity can collect information about the received PDUs as they are received within the reception window. This information can include the position of the PDU in the window. The receiving PDCP can send to the transmitting PDCP entity statistical information from the data collected. This could be, for example, the mean position of received PDUs with respect to the reception window and/or lowest and highest positions taken by the PDU within the window. These statistics can be sent for each of the originating RLC entities. The statistics can distinguish between the different RLC entities and provide joint and/or separate statistics.

The information could be sent in the form of a PDCP control PDU, but also or alternatively could be included in an RRC message to guarantee the transmission of and to account, for instance, for the uni-directional data radio bearers (DRBs).

With this information, the transmitter can take measures to avoid a situation in which PDCP UM PDUs fall out of the receiving window and create HFN desynchronization. Alternatively, the transmitter can promptly react to HFN de-synchronization when it occurs.

According to certain embodiments, for each logical channel (LCH) of a split bearer or a bearer mapped to several logical channels in case duplication with carrier aggregation, the RLC layer can indicate the latest PDCP SN that has been delivered to the MAC layer. If the window moving forward by one path results in PDCP PDUs of the other path falling out of the transmission window, the PDCP layer can discard those PDCP PDUs of the other path falling out of the transmission window, and no other duplicate for the corresponding SDU may be further delivered to the RLC.

This approach may involve the PDCP layer separately maintaining the last submitted SN to all paths for which the PDCP entity is configured to duplicate data.

The PDCP layer can echo this discard to the lower layers (for example, at least to the RLC layer), although lower layers may be allowed to have some offline processing.

The transmission window for the duplicated DRB (for example, a DRB that is mapped to at least two logical channels such that the duplicate packets are sent via different logical channels) could be (for example) half of the PDCP SN space or alternatively could be a smaller window configured via RRC signaling to ensure the two paths transmit PDUs closely enough, taking into account any delay requirements for URLLC.

UE may be configured to indicate to the network (NW) the event(s) when the UE transmission (Tx) window of another path is falling behind the configured limit. The indication could be done via RRC signaling or in the form of a PDCP control PDU.

Figure 3:
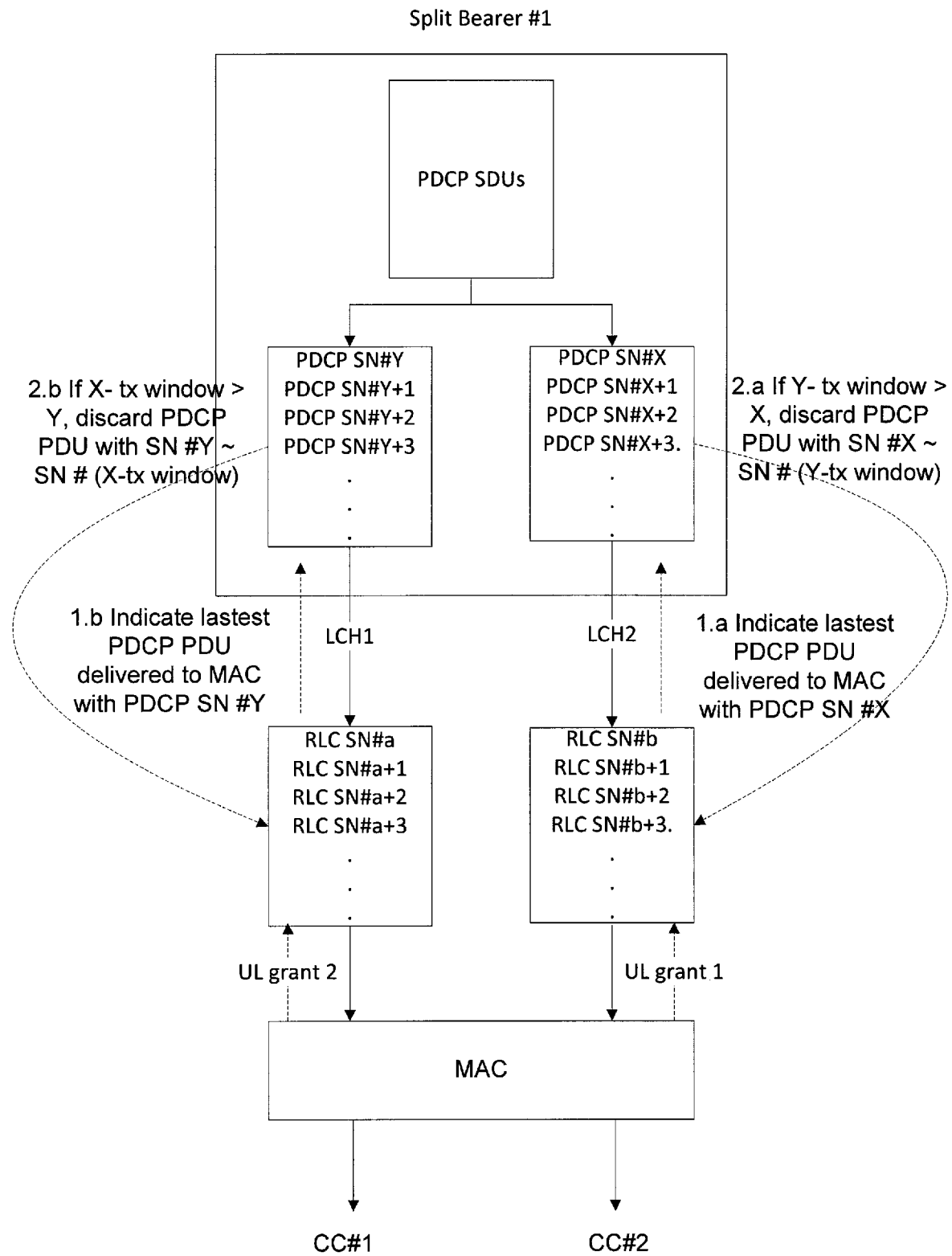
FIG. 3 illustrates interaction between PDCP and RLC for transmission window handling, according to certain embodiments.

FIG. 3 illustrates interaction between PDCP and RLC for transmission window handling, according to certain embodiments. A split bearer can have two alternative meanings: split bearer as specified for dual connectivity where the different legs are mapped to logical channels carried by separate eNBs (or gNBs) or a duplicated bearer which is mapped to two or more logical channels such that the duplicates are transmitted via different logical channels. In the latter case, the logical channels can be carried by the same gNB (using carrier aggregation) or by separate gNBs (using dual or multi connectivity). As shown in FIG. 3, For the two LCHs of a split bearer, at 1a, the RLC can indicate for LCH2 the latest PDCP PDU delivered to MAC is with PDCP SN #X. At 1b, the RLC can indicate for LCH1 the latest PDCP PDU delivered to MAC is with PDCP SN #Y. Moreover, at 2a, if Y−tx_window>X, PDCP can discard PDCP PDUs with sequence number from SN #X to SN #(Y−tx_window−1), and can indicate to RLC to discard corresponding RLC SDUs for LCH2. At 2b, if X−tx_window>Y, PDCP can discard PDCP PDUs with sequence number from SN #Y to SN #(X−Tx_window−1), and can indicate to RLC to discard corresponding RLC SDUs for LCH1.

In certain embodiments, for a split bearer over RLC UM, when a PDCP PDU or its final segment is submitted to a lower-layer protocol for transmission, a timer associated with that PDU can be started. Based on expirations of such timers for different PDUs, a record can be kept on the oldest PDCP PDU that may still undergo transmission over the radio. The oldest PDCP PDU may be the one that was earliest submitted to the lower layer, and hence the one assigned with the lowest PDCP COUNT value.

The record can be used by the data-transmitting PDCP entity to determine whether a PDCP PDU associated with a given COUNT value can be submitted yet to lower layers for transmission. Certain embodiments may apply both to uplink transmission on UE transmitter and to downlink transmission on a master node or secondary node.

The PDCP transmission window can be controlled by the record and the timer so that the SN difference between two legs does not exceed the transmission window size. PDCP PDU transmission on one leg may have to wait for the other leg if the SN difference is reached or the PDCP PDUs on the other leg may be discarded (especially in the case of duplication).

The timer can be located in RLC on both legs. Other alternatives, however, are also permitted.

In certain embodiments, the timer can be applied, and the record can be kept, separately at each transmitting RLC-UM entity involved in the split-bearer or duplicated bearer transmission. That RLC-maintained record can be indicated to the PDCP entity, which can take all the RLC-specific records into account. For example, the PDCP entity can derive from the RLC-specific records the lowest-numbered PDCP PDU that may still undergo transmission. In uplink operation, this indication from RLC to PDCP can be local at the UE. In downlink operation, this indication can be an inter-node indication standardized as part of a protocol such as X2-U, TS 36.425 in case of dual connectivity or an intra-node local indication in case of duplicated bearer in carrier aggregation.

In terms of the example described above, on the data-transmitting side, the peer of the second RLC entity can have started a timer of the kind described here upon submitting to MAC for transmission the RLC SDU which is the PDCP PDU with SN=3. The duration of the timer can have been configured to cover the maximum time that the RLC SDU can be expected to undergo HARQ retransmissions at MAC. As long as that timer has not expired, that transmitting RLC entity may not give an indication to PDCP that the PDCP PDU with SN=3 is no longer expected to undergo transmissions over the radio. While it is the case that the PDCP PDU with SN=3 can still be expected to undergo transmissions over the radio, the data-transmitting PDCP entity may not submit for transmission any more recently generated PDCP PDU with SN greater than 10. Hence the described HFN desync can be avoided.

There is an alternative that this is all done by PDCP. In that case, the timer duration may cover the maximum expected RLC-queuing time, which may have a lot of uncertainty, plus HARQ delay at MAC. By contrast, according to the embodiment described above, the timer duration may only need to cover the maximum expected HARQ delay. For URLLC services, the timer may be set to very low values since URLLC services may not allow retransmissions at any layer or only, for example, one retransmission by HARQ.

In the above-described embodiments, how exactly the timer is applied, and what is inferred from its expiry, may depend on what assumptions hold. For example, if it is assumed that PDCP PDUs from a given RLC entity are always placed in MAC PDUs strictly in the consecutive order in which they were received from PDCP, then it may be sufficient for the RLC to start the proposed timer for the most recent PDCP PDU submitted to MAC for a given MAC PDU or TTI. Once the timer expires for that PDCP PDU, it may be concluded that among the PDCP PDUs handled by that RLC entity, the PDU for which the timer expired or other PDUs older than that will no longer undergo transmission over the radio under that RLC entity.

In more detail, the use of the record(s) by PDCP may be such that submission of a new PDCP PDU to a lower layer may require that the PDCP SNs of the oldest PDUs that may still undergo transmission from any involved transmitting RLC entity, and the PDCP SN of the PDU to be submitted to lower layer, may all fit within the PDCP receiving window in use at the peer PDCP entity. So the timer may expire when it is expected that the PDU can no longer undergo transmission over the radio.

Figure 4:
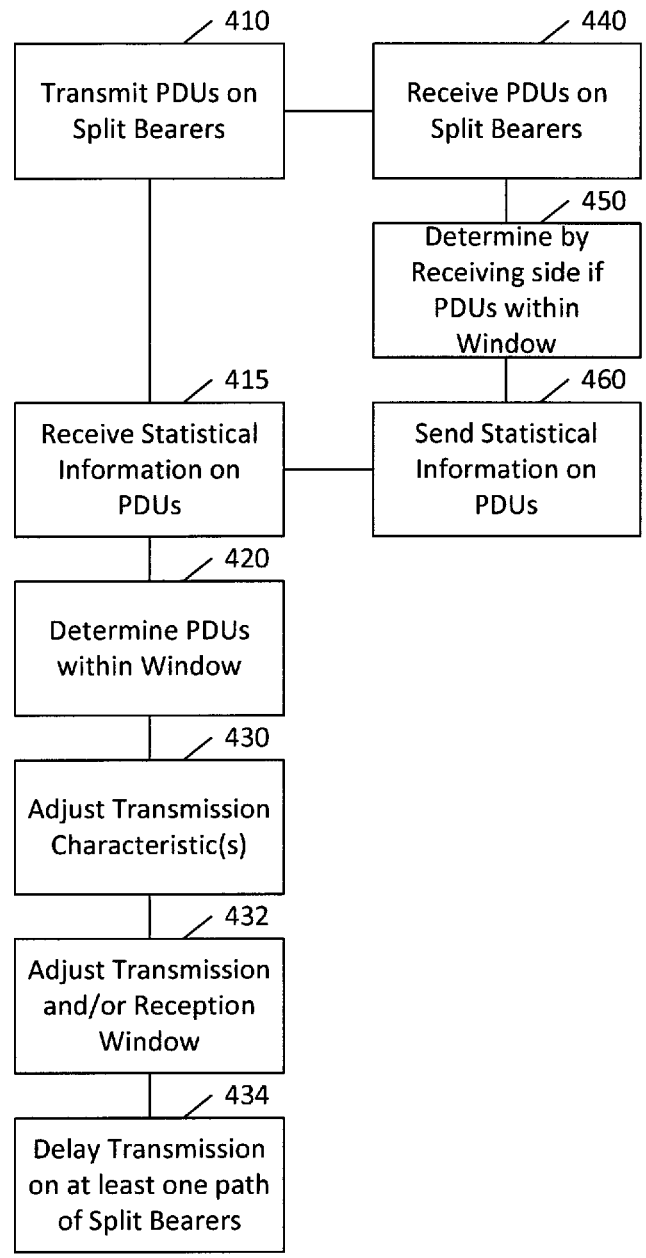
FIG. 4 illustrates a method according to certain embodiments.

FIG. 4 illustrates a method according to certain embodiments. As shown in FIG. 4, a method can include, at 410, transmitting a plurality of protocol data units over a split bearer. This can be a split bearer in either of the alternative meanings set forth above. The protocol data units can be packet data convergence protocol data units. The transmitting entity can be an access node, such as an evolved Node B (eNB), a next generation node B (gNB), or any other base station or access point. Likewise, the transmitting entity can be a user equipment or other terminal device. The protocol data units can be transmitted in a radio link control unacknowledged mode.

The method can include managing at least one transmission characteristic of the transmitted plurality of protocol data units. This management process can include identifying information about how the protocol data units are being received and making management decisions, such as adjustments, accordingly. For example, the method can include, at 420, determining whether the protocol data units are located within a predefined zone of at least one of a transmission window and a receiving window. The determining can involve, at 415, receiving statistical information regarding the protocol data units from a target of the protocol data units. For example, if the sender is an access node, then the target may be a user equipment, or vice versa. The statistical information can include, for example, a mean position of the protocol data units and/or a highest and lowest position of the protocol data units.

The method can further include, as an aspect of the managing, at 430, adjusting at least one transmission characteristic. The adjusting the transmission characteristic can include, at 432, adjusting at least one of a size of the transmission window or a size of the receiving window based on the determination, or adjusting a throughput sent to one or more radio link control entity when one or more packet data units of the plurality of protocol data units fall within a predefined zone of a reception window. The adjusting can also or alternatively include, at 434, delaying transmission on at least one path of the split bearer based on the determination. The delaying can be based on a timer having a duration corresponding to a longest expected delay of the protocol data units, or determining when a packet data convergence protocol packet data unit associated with a given count value can be transmitted. The adjusting the transmission characteristic can include discarding protocol data units from a first path of the split bearer when the protocol data units from the first path fall outside a transmission window for a second path of the split bearer.

The above described features are described from a transmitting side. There can also be corresponding features from a receiving side. For example, the method can include, at 440, receiving a plurality of protocol data units over a split bearer. These can be the same PDUs sent at 410.

The method can also include, at 450, determining whether the protocol data units are located within a predefined zone of at least one of a transmission window and a receiving window. The method can further include, at 460, sending information regarding the location of the protocol data units to a sender of the protocol data units. This information can be the statistical information received at 415.

Figure 5:
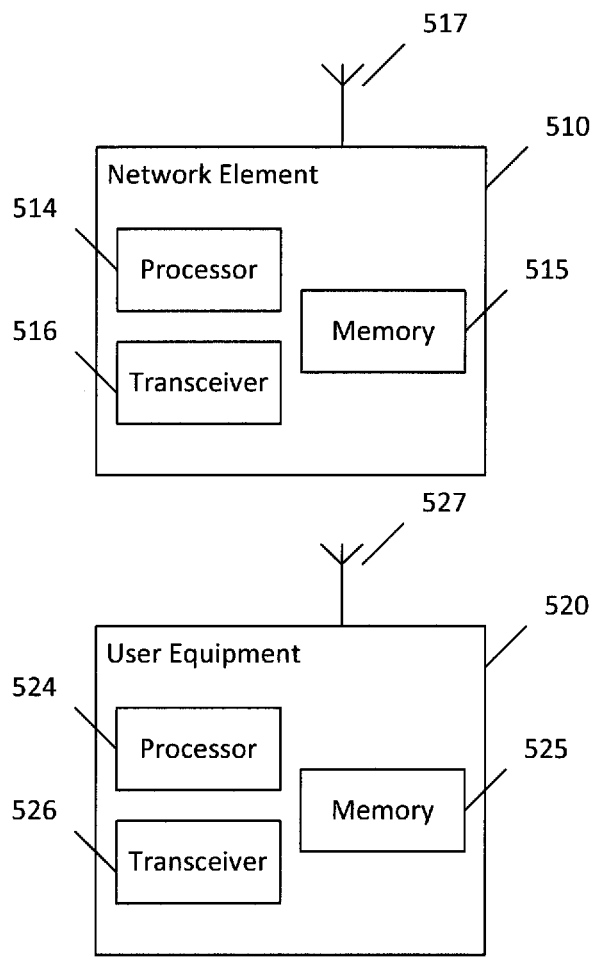
FIG. 5 illustrates a system according to certain embodiments.

FIG. 5 illustrates a system according to certain embodiments of the invention. It should be understood that each block of the flowchart of FIG. 4 may be implemented by various means or their combinations, such as hardware, software, firmware, one or more processors and/or circuitry. In one embodiment, a system may include several devices, such as, for example, network element 510 and user equipment (UE) or user device 520. The system may include more than one UE 520 and more than one network element 510, although only one of each is shown for the purposes of illustration. A network element can be an access point, a base station, an eNB, a gNB, or any other network element, such as a PCell base station or an SCell base station.

Each of these devices may include at least one processor or control unit or module, respectively indicated as 514 and 524. At least one memory may be provided in each device, and indicated as 515 and 525, respectively. The memory may include computer program instructions or computer code contained therein, for example for carrying out the embodiments described above. One or more transceiver 516 and 526 may be provided, and each device may also include an antenna, respectively illustrated as 517 and 527. Although only one antenna each is shown, many antennas and multiple antenna elements may be provided to each of the devices. Other configurations of these devices, for example, may be provided. For example, network element 510 and UE 520 may be additionally configured for wired communication, in addition to wireless communication, and in such a case antennas 517 and 527 may illustrate any form of communication hardware, without being limited to merely an antenna.

Transceivers 516 and 526 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner In other words, division of labor may vary case by case. One possible use is to make a network element to deliver local content. One or more functionalities may also be implemented as a virtual application that is provided as software that can run on a server.

A user device or user equipment 520 may be a mobile station (MS) such as a mobile phone or smart phone or multimedia device, a computer, such as a tablet, provided with wireless communication capabilities, personal data or digital assistant (PDA) provided with wireless communication capabilities, vehicle, portable media player, digital camera, pocket video camera, navigation unit provided with wireless communication capabilities or any combinations thereof. The user device or user equipment 520 may be a sensor or smart meter, or other device that may usually be configured for a single location.

In an exemplifying embodiment, an apparatus, such as a node or user device, may include means for carrying out embodiments described above in relation to FIG. 4.

Processors 514 and 524 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof. The term circuitry may refer to one or more electric or electronic circuits. The term processor may refer to circuitry, such as logic circuitry, that responds to and processes instructions that drive a computer.

For firmware or software, the implementation may include modules or units of at least one chip set (e.g., procedures, functions, and so on). Memories 515 and 525 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 510 and/or UE 520, to perform any of the processes described above (see, for example, FIG. 4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 5 illustrates a system including a network element 510 and a UE 520, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

LIST OF ABBREVIATIONS

AM Acknowledged Mode
CA Carrier Aggregation
DC Dual connectivity

HARQ Hybrid ARQ
HFN Hyper Frame Number
MAC Medium Access Control
NR New Radio
OTA Over-the-Air
PDCP Packet Data Convergence Protocol
PDU Protocol Data Unit
RLC Radio Link Control
SN Sequence Number
TTI Transmission Time Interval
UM Unacknowledged Mode
URLLC Ultra-reliable-low latency communications

What is claimed is:

1. An apparatus, comprising:
at least one processor; and
at least one memory including computer program code,
wherein the at least one memory and the computer program code are configured to, with the at least one processor, cause the apparatus at least to
transmit a plurality of protocol data units over a bearer mapped to a plurality of logical channels, wherein the protocol data units are transmitted in a radio link control unacknowledged mode; and
manage at least one transmission characteristic of the transmitted plurality of protocol data units;
wherein the managing the at least one transmission characteristic of the transmitted plurality of protocol data units comprises determining when a packet data convergence protocol packet data unit associated with a given count value can be transmitted.

2. The apparatus of claim 1, wherein the protocol data units comprise packet data convergence protocol data units.

3. The apparatus of claim 1, wherein the statistical information comprises at least one of a mean position of the protocol data units within a receiving window, a highest position of the protocol data units, and a lowest position of the protocol data units.

4. The apparatus of claim 3, wherein the at least one memory and the computer program code are configured to, with the at least one processor, cause the apparatus at least to adjust at least one of a size of the transmission window or a size of the receiving window based on the determination or adjusting a throughput sent to one or more radio link control entity when one or more packet data units of the plurality of protocol data units fall within a predefined zone of a reception window.

5. An apparatus, comprising:
at least one processor; and
at least one memory including computer program code,
wherein the at least one memory and the computer program code are configured to, with the at least one processor, cause the apparatus at least to
transmit a plurality of protocol data units over a bearer mapped to a plurality of logical channels, wherein the protocol data units are transmitted in a radio link control unacknowledged mode; and
manage at least one transmission characteristic of the transmitted plurality of protocol data units;
wherein the managing comprises determining when a packet data convergence protocol packet data unit associated with a given count value can be transmitted.

6. The apparatus of claim 5, wherein the determination is based on a timer.

7. The apparatus of claim 6, wherein the timer starts when a packet data convergence protocol packet data unit, or a final segment of the packet data convergence protocol packet data unit, is submitted to a lower-layer protocol for transmission.

8. The apparatus of claim 6, wherein the at least one memory and the computer program code are configured to, with the at least one processor, cause the apparatus at least to, based on expiration of one or more instances of the timer, keep a record on the oldest packet data convergence protocol packet data unit that may still undergo transmission over radio.

9. The apparatus of claim 8, wherein the record is used to determine whether to submit a packet data convergence protocol packet data unit associated with the given count value to lower layers for transmission.

10. An apparatus, comprising:
at least one processor; and
at least one memory including computer program code,
wherein the at least one memory and the computer program code are configured to, with the at least one processor, cause the apparatus at least to
receive a plurality of protocol data units over a bearer mapped to a plurality of logical channels, wherein the protocol data units are transmitted in a radio link control unacknowledged mode; and
send information regarding the location of the protocol data units to a sender of the protocol data units;
wherein the information comprises statistical information regarding the protocol data units.

11. The apparatus of claim 10, wherein the protocol data units comprise packet data convergence protocol data units.

12. The apparatus of claim 10, wherein the statistical information comprises one of a mean position of the protocol data units, and a highest position of the protocol data units and a lowest position of the protocol data units.

* * * * *